US005532721A

United States Patent [19]

Asano et al.

[11] Patent Number: 5,532,721

[45] Date of Patent: Jul. 2, 1996

[54] DIELECTRIC DRUM AND ELECTROSTATIC RECORDING DEVICE USING THE SAME

[75] Inventors: Kazuo Asano; Koji Masuda, both of Kanagawa; Takuo Kusano, Tokyo; Ken Ebihara, Shizuoka, all of Japan

[73] Assignees: Fuji Xerox Co., Ltd.; Nippon Light Metal Company, Ltd.; Nikkei Techno-Research Co., Ltd., all of Tokyo, Japan

[21] Appl. No.: 408,177

[22] Filed: Mar. 22, 1995

Related U.S. Application Data

[63] Continuation of Ser. No. 960,831, Oct. 14, 1992, abandoned.

[30] Foreign Application Priority Data

Oct. 16, 1991 [JP] Japan .................................. 3-294788

[51] Int. Cl.$^{6}$ .................................................. G01O 15/06

[52] U.S. Cl. ...................... 347/112; 347/153; 346/135.1; 346/138; 428/36.91; 428/472.2

[58] Field of Search .................................. 347/112, 153, 347/154; 346/135.1, 138; 428/36.91, 472.2

[56] References Cited

U.S. PATENT DOCUMENTS

| | | | |
|---|---|---|---|
| 3,615,405 | 10/1971 | Shebanow | 430/60 |
| 4,195,927 | 4/1980 | Fotland et al. | 346/160 |
| 4,318,755 | 3/1982 | Jeffrey et al. | 148/11.5 |
| 4,424,981 | 1/1984 | Maxwell, III | 280/288 |
| 4,518,468 | 5/1985 | Fotland et al. | 205/204 |
| 4,745,030 | 5/1988 | Arahara et al. | 428/421 |
| 4,864,331 | 9/1989 | Boyer et al. | 346/160.1 X |
| 5,245,358 | 9/1993 | Reeves | 346/138 |

FOREIGN PATENT DOCUMENTS

| | | |
|---|---|---|
| 60-500831 | 5/1985 | Japan . |
| 63-294586 | 1/1988 | Japan . |

*Primary Examiner*—Peter S. Wong
*Assistant Examiner*—Randy W. Gibson
*Attorney, Agent, or Firm*—Finnegan, Henderson, Farabow, Garrett & Dunner

[57] ABSTRACT

It is an object of the invention to provide a dielectric drum where manufacturing costs can be reduced while keeping pressure resistance high and having an anodic oxidized film with a uniform dielectric characteristic, and also to provide an electrostatic recording device which is inexpensive and provides a high image reliability using the dielectric drum. According to the present invention, a dielectric drum includes an aluminum substrate and a dielectric layer of an anodic oxidized film on the surface of the aluminum substrate. The aluminum substrate is produced by conducting a drawing and hardening treatment M on an aluminum alloy pipe of the 5000 series alloys of the Aluminum Association. Also, the dielectric drum is used to construct an electrostatic recording device. The electrostatic recording device includes toner image forming means for forming a toner image on a dielectric drum, and pressure applying means for transferring by pressure or transferring and fixing by pressure the toner image on the dielectric drum to a member to be transferred.

4 Claims, 2 Drawing Sheets

DIELECTRIC DRUM AND ELECTROSTATIC RECORDING DEVICE USING THE SAME

This application is a continuation, of application Ser. No. 07/960,831, filed Oct. 14, 1992, now abandoned.

BACKGROUND OF THE INVENTION

The present invention relates to a dielectric drum and an electrostatic recording device using the dielectric drum and, in particular, to a dielectric drum including an aluminum substrate and a dielectric layer of an anodic oxidized film disposed on the surface of the aluminum substrate as well as an electrostatic recording device which uses such dielectric drum to transfer a toner image by pressure or to transfer and fix a toner image by pressure.

As a conventional electrostatic recording device, for example, there is known a device which is disclosed in Unexamined Japanese Patent Publication Sho. 60-500831. In this electrostatic recording device, an electrostatic latent image is formed to an image signal on a dielectric drum properly by use of a latent image forming device, the electric latent image on the dielectric drum is actualized by means of a toner contained in a developing device, and after then the toner image on the dielectric drum is transferred by pressure or transferred and fixed by pressure onto a medium to be transferred by use of a pressure roll.

A dielectric drum, which can be used in such electrostatic recording device, must be formed of a material which is light in weight in order to satisfy a condition that the electrostatic recording device must be light. Also, the electrostatic recording device must have a hardness and a tensile strength which are sufficient to withstand mechanical stresses produced in a pressure transfer step or in a pressure transfer/fix step. Further, the recording device must have a hardness which is sufficient to avoid a collapsing phenomenon which could occur on the surface of the dielectric drum due to generation of a wrinkle in a recording paper. In other words, if a wrinkle is formed in the recording paper, then high pressure points form locally on the surface of the dielectric drum, so that the portions of the dielectric drum surface corresponding to the wrinkles in the recording paper collapse down. This is referred to as "collapsing phenomenon" in this specification. The collapsing phenomenon induces poor transfer, poor cleaning or the like which results in a poor image quality and reduces the life of the dielectric drum itself.

In view of this, conventionally, a dielectric drum is manufactured by performing an anodic oxidizing processing on the surface of an aluminum substrate formed of an aluminum alloy pipe of the 6000 or 7000 series alloys of the Aluminum Association and then by disposing a dielectric layer of an anodic oxidized film on the surface of the aluminum substrate. In addition, in order to keep an image transfer property, a cleaning property or the like, the surface roughness (here, the maximum height [JIS]: the greatest amplitude in a standard length) of the dielectric drum must be, for example, 0.5S (maximum height 0.5 μm) or less at the time when the aluminum substrate is finally produced.

However, when a pipe is formed of the 6000 or 7000 series alloys of the Aluminum Association (especially, the 7000 series is referred to as a hard metal) having high hardness and tensile strength, it is not easy to work the pipe by drawing, resulting in the increased working costs thereof. In addition to the high costs, even if an impurity control processing is performed on these aluminum alloys (for example, a homogenization processing by heating which is performed while the aluminum alloy is in a billet state before the draw working of the pipe), because such aluminum alloy contains various kinds of impurities, a large number of under-surface voids and surface pits occur in an anodic oxidization treated film, which voids and pits are unfavorable because they deteriorate the property of the film.

Also, the aluminum alloy of AA6000 or 7000 series Alloy having high hardness and tensile strength generally contains a large number of impurities (metals) and the surface roughness thereof is increased when it is anodically oxidized. Therefore, normally, in homogenizing the dielectric property of the anodic oxidized film, the surface of the pipe formed of such aluminum alloy is finished after the anodic oxidization treatment so as to be able to keep the above-mentioned surface roughness within an allowable range. In this surface finishing, due to the fact that the anodic oxidized film has a surface hardness of the order of 5 times that of the aluminum alloy, it takes a long time perform a surface finishing step after the anodic oxidizing treatment, which makes it difficult to obtain an anodic oxidized film having a uniform dielectric property.

In other words, when the 6000 or 7000 series alloy is used as a substrate for a dielectric drum which includes a dielectric layer of an anodic oxidized film, the manufacturing costs of the dielectric drum are high and also there arises a technical problem that it is difficult to obtain an anodic oxidized film having a uniform dielectric property. As a result of this, an electrostatic recording device using this kind of dielectric drum is inevitably expensive and there arises a possibility that a reliability on the dielectric property of the dielectric drum is to be degraded.

SUMMARY OF THE INVENTION

In view of the foregoing problems, an object of the present invention to provide a dielectric drum which can reduce the manufacturing costs thereof while maintaining a good pressure resistance and can easily provide an anodic oxidized film having a uniform dielectric property.

It is another object of the invention to provide an inexpensive and highly reliable electrostatic recording device using such dielectric drum.

In order to attain the above object, according to the invention, there is provided a dielectric drum which comprises an aluminum substrate and a dielectric layer of an anodic oxidation film disposed on the surface of the aluminum substrate, wherein the aluminum substrate is formed of a M treated (drawn and hardened treatment) aluminum alloy pipe of the AA5000 series alloy of the Aluminum Association.

Also, in achieving the above object, according to the invention, by using the above-mentioned dielectric drum, there is provided an electrostatic recording device which comprises the above-mentioned dielectric drum, toner image forming means for forming a toner image on the dielectric drum, and pressure applying means for transferring by pressure or transferring and fixing by pressure the toner image on the dielectric drum to a member to be transferred.

DETAILED DESCRIPTION OF THE PREFERRED EMBODIMENTS

Description of the present invention with reference to an embodiment shown in the accompanying drawings is provided below.

Figure 1:
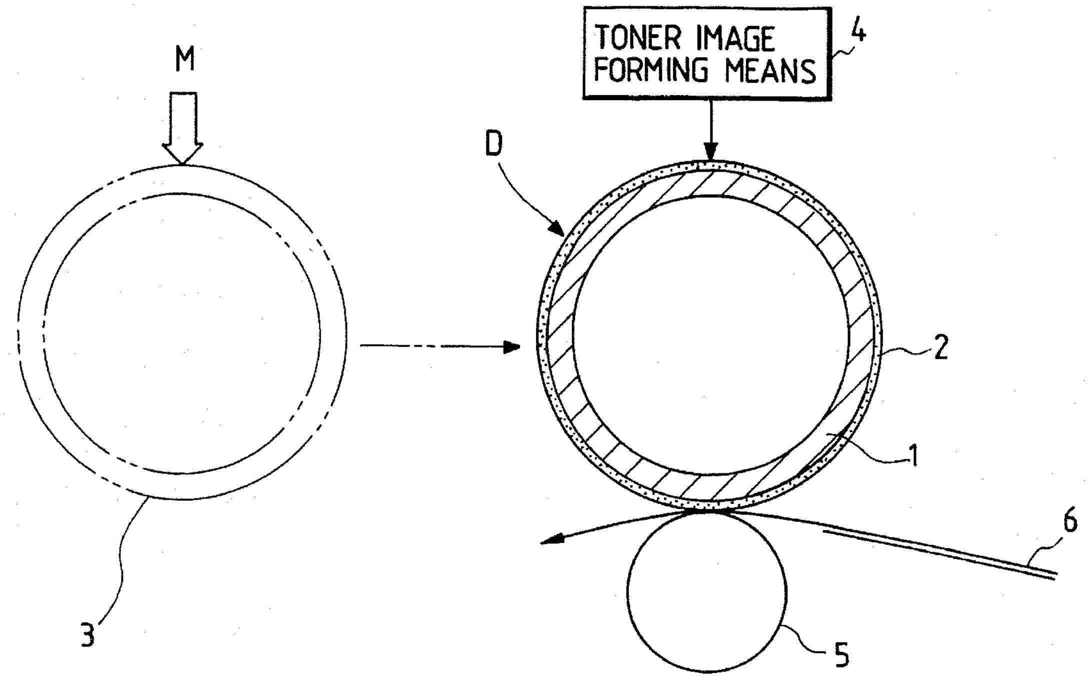
FIG. 1 is an explanatory view of a dielectric drum according to the invention and a first embodiment electrostatic recording device using the present dielectric drum.

In FIG. 1, there is provided a first electrostatic recording device which comprises a dielectric device of the present invention, toner image forming means 4 for forming a toner image on the dielectric drum D, and pressure applying means 5 for transferring by pressure or transferring and fixing by pressure the toner image on the dielectric drum D to a member to be transferred 6.

In the present technical means, as the 5000 series alloys of the Aluminum Association used as the aluminum substrate 1, there are employed Al-Mg alloy such as JIS A5052, A5154, A5454, A5056, A5083 and the like.

Also, the drawing and hardening treatment M in general includes a treatment designated by H according to the JIS quality classification in which an alloy is cold worked and tempered. In this treatment M, in order to improve the reliability of the dielectric property, it is preferred to execute a stabilizing treatment such as a thermal treatment or the like which can remove the distortion of the aluminum alloy pipe 3 that could occur in the drawing and hardening treatment.

Further, the degree of working and hardening of the aluminum alloy pipe 3 can be selected conveniently according to the objects of use of the dielectric drum D. However, when it is used as an electrostatic recording device, the aluminum alloy pipe 3 not only must have such hardness and tensile strength that withstand mechanical stresses occurring in the pressure transferring operation or in the pressure transferring and fixing operation, but also must have the degree of hardness that can prevent it from being dented due to wrinkles in recording paper. When the aluminum alloy pipe 3 is used to construct an electrostatic recording device, the Vickers' of the surface hardness of the aluminum alloy pipe 3 must be greater than that of the pressure applying means 5 such as a pressure roll or the like; for example, in consideration of a polyacetal pressure roll as the currently available pressure applying means, the aluminum alloy pipe 3 should be worked and hardened up to at least a hardness of HV 100.

Also, in the electrostatic recording device, the toner image forming means 4 can be of various designs, provided that it is able to form a toner image on the dielectric drum D; for example, it can be designed such that an electrostatic latent image by means of ions is firstly written onto the dielectric drum D and the electrostatic latent image is then visualized by a toner provided in the developing means; or, such that an electrostatic latent image, by means of ions, is firstly written onto the toner layer of the surface of a developing roll and then the electrostatic latent image is transferred onto the dielectric drum D.

Further, as to the pressure applying means 5, any type of means can be selected, provided that it is able to transfer by pressure or transfer and fix by pressure a toner image on the dielectric drum D to the member to be transferred 6. However, in consideration of simplicity of delivery of the member to be transferred 6, a roll-type means is preferable.

Also, in the absence of the member to be transferred 6, the pressure applying means 5 comes into contact with the dielectric drum D. In view of this, the pressure applying means 5 must have a hardness lower than that of the dielectric drum D, or it must be formed of a material from which a toner can be easily removed even if the toner is attached in error to the pressure applying means 5. Currently, as the pressure applying means, an engineering plastic such as polyacetal or the like is used.

According to the above-mentioned technical means, since the aluminum alloy pipe 3 of the AA5000 series alloy of the Aluminum Association is lower in hardness than the AA6000 or 7000 series alloy, the drawing forming of the aluminum alloy pipe can be executed with ease and, in addition, the surface roughness of the pipe after the anodic oxidizing treatment thereof can be controlled to a low level, which makes it easy to perform an after-process treatment.

After the aluminum alloy pipe 3 of the AA5000 series Alloy is drawn and hardened, an anodic oxidizing treatment is performed on the surface of the aluminum substrate of the alloy pipe 3. In this case, because the aluminum alloy 3 has a smaller number of kinds of impurities than the AA6000 or 7000 series Alloy, the difference between the surface roughness of the anodic oxidized film before and after it is treated is minimized. Also, since the alloy pipe 3 has a smaller number of kinds of impurities (such as silicon which will be discussed below) other than magnesium (Mg: soluble in a solution) when compared with the aluminum alloy of the AA6000 or 7000 series Alloy, the appearances of the under-surface voids and surface pits of the anodic oxidized film can be reduced.

When analyzing in more detail the variations of the surface roughnesses of the anodic oxidized film before and after the anodic oxidizing treatment, an aluminum alloy of AA6000 series Alloy contains silicon (Si) as an alloy. This silicon is not anodically oxidized, but remains in the anodic oxidized film as is, which makes it difficult for aluminum to be oxidized, resulting in dents on the surface of the anodic oxidized film. Also, silicon is low in solubility with respect to aluminum and easily gathers in the area of the interface surface of the top layer of the dielectric drum, so that the increased amount of silicon contained in the drum top layer has effects on the surface roughnesses of the anodic oxidized film.

On the other hand, an aluminum alloy of AA5000 series Alloy is an alloy of a magnesium (Mg) system, in which Mg will be easily solved in an oxidized solution providing no problem to the oxidization of aluminum Mg is highly soluble and is dispersed uniformly in aluminum, so that the variations in the surface roughnesses can be minimized.

Further, the pressure resistance of the aluminum alloy pipe 3 of AA5000 series Alloy can be sufficiently increased by use of a relatively simple drawing/hardening treatment M and thus the alloy pipe 3 can provide the hardness and tensile strength required of the aluminum substrate 1 of the dielectric drum.

Figure 2:
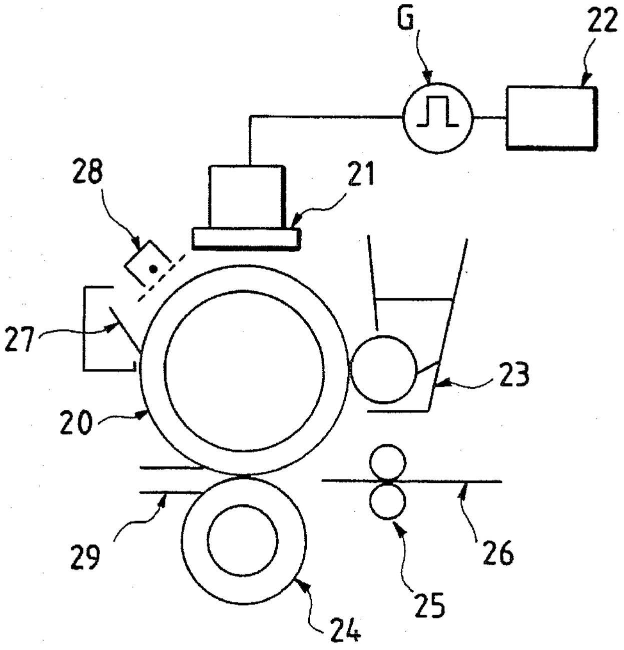
FIG. 2 is an explanatory view of a second embodiment of an electrostatic recording device to which the invention is applied.

In FIG. 2, a second embodiment of an electrostatic recording device to which the invention is applied is shown.

In FIG. 2, reference numeral 20 designates a dielectric drum; 21 an ion flow recording head for writing an electrostatic latent image in the form of irradiation ions onto the dielectric drum 20 in accordance with an image signal G from an image signal generation device 22; 23 a developing device for toner developing the electrostatic latent image on the dielectric drum 20 into a toner image; 24 a pressure roll (in this embodiment, the pressure to be applied to recording paper 26 is about 170 kg/cm$^2$) disposed against the transfer part of the dielectric drum 20 for transferring and fixing simultaneously the toner image on the dielectric drum 20 to recording paper 26 which is fed by a paper feed roll 25; 27 a cleaner such as a cleaning blade or the like for picking up and removing a slight amount of toner or paper scrap remaining on the dielectric drum 20 after the transferring and fixing step; 28 an electric charge removing device such as a scorotron or the like for removing residual electric charges on the dielectric drum 20 after the transferring and fixing step; and, 29 a strip finger for peeling off the recording paper 26 from the dielectric or drum 20 and pressure roll 24 after the transferring and fixing step.

Figure 3:
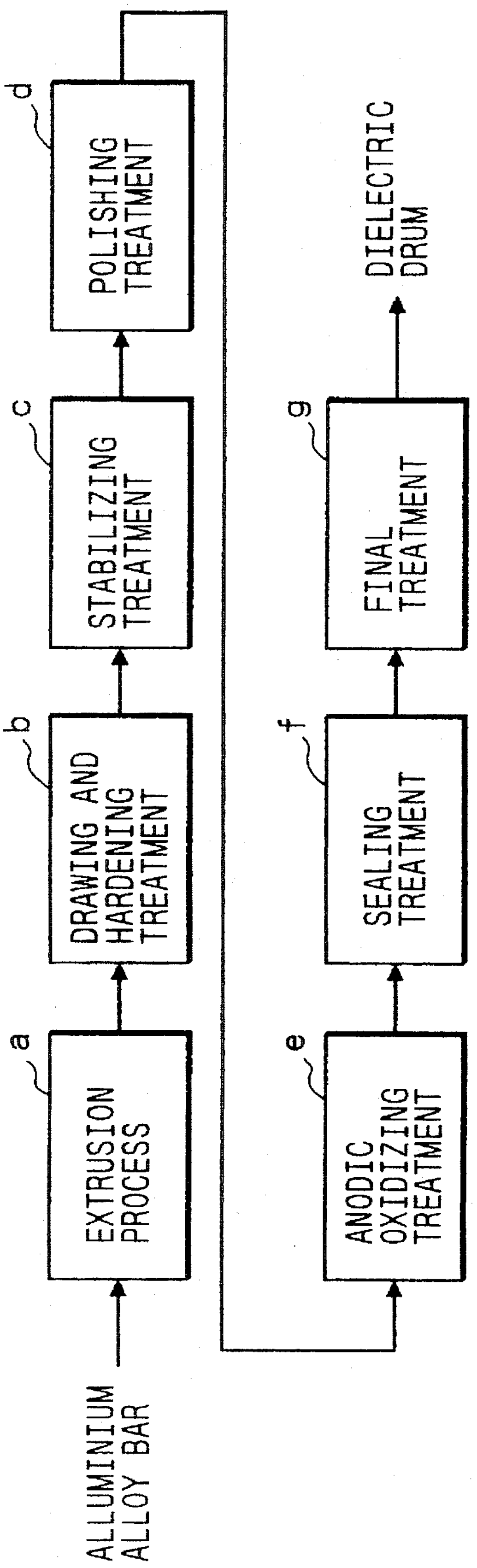
FIG. 3 is an explanatory diagram showing a process of manufacturing a dielectric drum of the present invention.

The dielectric drum 20 used in the present embodiment is manufactured in a manner shown in FIG. 3.

In other words, in the present embodiment, at first, an A 5056 aluminum alloy bar, which is one of aluminum alloys of the AA5000 series Alloy, passes through the extrusion process in a pipe (step a) to hereby produce an aluminum alloy pipe of a predetermined size.

Next, a treatment, which is referred to as a JIS quality classification code H38 is executed on the above aluminum alloy pipe. Specifically, the aluminum alloy pipe is drawn and hardened (treatment step b). After the drawing and hardening treatment, the alloy pipe is heated under low temperatures (for example, temperatures of 200° to 300° C., for a period of time of 30 min. to 2 hrs.) to be stabilized (a step c). In this embodiment, the alloy pipe is worked and hardened until the surface hardness of the alloy pipe has a Vickers hardness of about HV 100.

Further, the surface of an aluminum substrate, of the aluminum alloy pipe already processed by the drawing/hardening treatment and stabilization treatment, is polished to a surface roughness of 0.4S (a step d in this specification). After then, a given anodic oxidizing treatment is applied then to the alloy pipe (Unexamined Japanese Patent Publication Sho. 63-294586) (a step e), forming on the aluminum substrate surface a dielectric layer of an anodic oxidized film.

After step e, for example, as disclosed in Unexamined Japanese Patent Publication Sho. 63-294586, a given porosity sealing treatment (step f) is performed on the dielectric layer of the aluminum substrate surface. Also, after resin on the surface is removed the dielectric layer is buff polished to $R_{max}$ 0.2 μm (which is the final finishing work and is herein referred to as a step g), thereby providing the above-mentioned dielectric drum 20.

Next, the variations of the surface roughnesses before and after the anodic oxidizing treatment of the dielectric drum to be used in the present embodiment are measured, as shown in Table 1, illustrated below. The surface roughnesses after the anodic oxidizing treatment is 0.5S. The surface roughness after the anodic oxidizing treatment varies little from the surface roughness 0.4S before the anodic oxidizing treatment. Hence, in this invention, the surface roughness is expressed by the maximum height. In the United States, the center line mean roughness (Ra) defined by ANSI B 46.1-1978 standard is mainly used in the expression of the surface roughness. It is obvious to those skilled in the art that Ra is quarter as volume as the maximum height. Namely, 0.5S, 0.4S and 0.9S are converted into 0.5/4.a, 0.4/4.a and 0.9/4.a, respectively.

For comparison, a JIS A6061-T6 aluminum alloy pipe was polished until the surface roughness became 0.4S and then processed by the anodic oxidizing treatment in a similar method to the above-mentioned embodiment, the resulting alloy pipe is referred to as comparison example 1. When the surface roughness of comparison example 1 was measured, it showed a value of 0.9S, about double the value obtained before the anodic oxidizing treatment.

When the Example and comparison example 1 are compared with each other, because the surface roughness after the anodic oxidization treatment of the dielectric drum 20 according to the present embodiment varies little from before the anodic oxidation treatment, it can be understood that the final finishing treatment of the dielectric drum 20 is far easier than comparison example 1.

TABLE 1

| | Aluminum Substrate | Surface Roughness before Treatment | Surface Roughness after Treatment |
|---|---|---|---|
| Example | AH5056-H38 | 0.4 S | 0.5 S |
| Comparison Example 1 | A6061-T6 | 0.4 S | 0.9 S |

A paper wrinkle trouble test using an electrostatic recording device according to the present embodiment was performed, with a crease of about 1 mm previously formed in the recording paper 26. The recording paper 26 was loaded into a paper feed device, a pressure of a total load of about 700 kg was applied to the recording paper 26 to generate wrinkles in the recording paper 26. The dielectric drums were checked for recessions, shown in Table 2, illustrated below. No recession was found in the dielectric drum of the example 20. And, when a printing test was conducted using such dielectric drum 20, a good image was obtained.

TABLE 2

| | Aluminum Substrate | Hardness HV of Substrate Surface | Generation of Drum Recession |
|---|---|---|---|
| Example | A5056-H38 | 100 | No |
| Comparison Example 2 | A5056-F | 80 | Yes |

Also, in order to confirm the priority of an electrostatic recording device according to the present embodiment, a JIS A 5056 aluminum alloy pipe was exposed to an anodic oxidizing treatment in a manner similar to the comparison example 1 without exposing the alloy pipe to any drawing and hardening treatment, exposed to a sealing treatment similar to the present embodiment, and surface finished to produce a dielectric drum. The thus produced dielectric drum is referred to as a comparison example 2. When a paper wrinkle trouble test similar to the present embodiment was conducted using an electrostatic recording device employing the comparison example 2, shown in Table 2, recessions were found in the part of the dielectric drum (comparison example 2) that corresponds to the paper wrinkle in a first test. When a printing test was conducted using comparison example 2, the quality of an image was deteriorated.

As described above, according to the invention, because as the aluminum substrate of a dielectric drum there is one which is obtained by drawing and hardening AA5000 series Alloy aluminum alloy pipe, a dielectric drum can be produced highly efficiently, has a uniform dielectric characteristic, and has a high pressure resistance.

In other words, when compared with the AA6000 or 7000 series Alloy, according to the invention, extrusion forming of the aluminum alloy pipe can be achieved more easily.

Because the surface roughness of the alloy pipe after the anodic oxidizing treatment can be controlled to a low level, treatments in the following steps can be executed with ease, so that the productivity of the dielectric drum can be improved.

Additionally, according to the invention, the occurrences of the under-surface voids and surface pits in the anodic oxidized film can be restricted and the surface roughness after the anodic oxidizing treatment can be also be controlled to a low level, so an anodic oxidized film having a uniform dielectric characteristic can be made easily.

Furthermore, because a relatively simple drawing and hardening treatment is applied to the AA5000 series alloy, originally having low hardness and tensile strength, to increase the hardness and tensile, strength a high pressure resistance can be obtained when transferring by pressure or transferrihg and fixing by pressure a toner image, without impairing the quality of the aluminum alloy pipe.

Also, according to the invention, because a dielectric drum produced with high efficiency, is used, having a uniform dielectric characteristic and a high pressure resistance, an electrostatic recording device which is inexpensive and has a high image reliability can be produced.

What is claimed is:

1. A dielectric drum for transferring a toner image to a recording paper used in electrostatic recording comprising:

a substrate having an outer surface;

a dielectric layer formed of an anodic oxidized film on said outer surface of said substrate, wherein said substrate is formed by drawing and hardening an aluminum alloy pipe of the 5000 series alloys of the Aluminum Association; and said outer surface of said substrate having a surface hardness not less than 100 in terms of the Vicker's hardness.

2. An electrostatic recording device, comprising:

a dielectric drum for transferring a toner image to a recording medium;

toner image forming means for forming said toner image on said dielectric drum;

pressure applying means for applying a pressure to the outer surface of said dielectric drum to transfer said toner image on said dielectric drum to said recording medium, wherein said dielectric drum is formed by drawing and hardening an aluminum alloy pipe of the 5000 series alloys of the Aluminum Association; and said outer surface of said dielectric drum having a surface hardness not less than 100 in terms of the Vicker's hardness.

3. A dielectric drum for transferring a toner image to a recording paper used in electrostatic recording comprising:

a substrate having an outer surface;

a dielectric layer formed of an anodic oxidized film on said outer surface of said substrate, wherein said substrate is formed by drawing and hardening an aluminum alloy pipe of the 5000 series alloys of the Aluminum Association; and said outer surface of said substrate having a surface roughness such that a maximum height of standard reference length at 0.25 mm is not more than 0.4 μm.

4. An electrostatic recording device, comprising:

a dielectric drum for transferring a toner image to a recording medium;

toner image forming means for forming said toner image on said dielectric drum;

pressure applying means for applying a pressure to the outer surface of said dielectric drum to transfer said toner image on said dielectric drum to said recording medium, wherein said dielectric drum is formed by drawing and hardening an aluminum alloy pipe of the 5000 series alloys of the Aluminum Association; and said outer surface of said dielectric drum having a surface roughness such that a maximum height of standard reference length at 0.25 mm is not more than 0.4 μm.

* * * * *